US010922884B2

United States Patent
Hu et al.

(10) Patent No.: US 10,922,884 B2
(45) Date of Patent: Feb. 16, 2021

(54) SHAPE-REFINEMENT OF TRIANGULAR THREE-DIMENSIONAL MESH USING A MODIFIED SHAPE FROM SHADING (SFS) SCHEME

(71) Applicant: SONY CORPORATION, Tokyo (JP)

(72) Inventors: Jie Hu, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 26 days.

(21) Appl. No.: 16/515,295

(22) Filed: Jul. 18, 2019

(65) Prior Publication Data

US 2021/0019939 A1 Jan. 21, 2021

(51) Int. Cl.
*G06T 17/20* (2006.01)
*G06T 7/507* (2017.01)
*G06T 3/00* (2006.01)

(52) U.S. Cl.
CPC ............ *G06T 17/20* (2013.01); *G06T 3/0037* (2013.01); *G06T 7/507* (2017.01)

(58) Field of Classification Search
None
See application file for complete search history.

(56) References Cited

U.S. PATENT DOCUMENTS

| 6,043,820 A * | 3/2000 | Iimura | G06T 15/20 |
| | | | 345/422 |
| 10,339,703 B2 * | 7/2019 | Lecocq | G06T 15/06 |
| 2004/0049309 A1 * | 3/2004 | Gardner | G06T 17/00 |
| | | | 700/132 |
| 2005/0062739 A1 * | 3/2005 | Balmelli | G06T 15/50 |
| | | | 345/426 |
| 2017/0132830 A1 * | 5/2017 | Ha | G06T 17/20 |

(Continued)

FOREIGN PATENT DOCUMENTS

JP 2009-521062 A 5/2009

OTHER PUBLICATIONS

Peng Guan, A. Weiss, A. O. Bālan and M. J. Black, "Estimating human shape and pose from a single image," 2009 IEEE 12th International Conference on Computer Vision, Kyoto, 2009, pp. 1381-1388, doi: 10.1109/ICCV.2009.5459300.*

(Continued)

*Primary Examiner* — Jason A Pringle-Parker
(74) *Attorney, Agent, or Firm* — Chip Law Group

(57) ABSTRACT

An electronic apparatus and method is provided for shape-refinement of a triangular 3D mesh using a modified Shape from Shading (SFS) scheme. The electronic apparatus generates a flat two-dimensional (2D) mesh based on an orthographic projection of an initial three-dimensional (3D) triangular mesh on an image plane that includes a plurality of square grid vertices. The electronic apparatus estimates a final grid depth value for each square grid vertex of the flat 2D mesh based on a modified SFS scheme. The modified SFS scheme corresponds to an objective relationship among a reference grid image intensity value, an initial grid depth value, and a grid albedo value for each square grid vertex of the plurality of square grid vertices. The electronic apparatus estimates a final 3D triangular mesh based on the initial 3D triangular mesh and the estimated final grid depth value.

20 Claims, 5 Drawing Sheets

(56) References Cited

U.S. PATENT DOCUMENTS

| | | | |
|---|---|---|---|
| 2018/0068178 A1* | 3/2018 | Theobalt | G06K 9/00315 |
| 2018/0308276 A1* | 10/2018 | Cohen | G06T 13/40 |
| 2020/0286284 A1* | 9/2020 | Grabli | G06T 17/20 |

OTHER PUBLICATIONS

R. White and D. A. Forsyth, "Combining Cues: Shape from Shading and Texture," 2006 IEEE Computer Society Conference on Computer Vision and Pattern Recognition (CVPR'06), New York, NY, USA, 2006, pp. 1809-1816, doi: 10.1109/CVPR.2006.79.*

M. A. Penna, "A shape from shading analysis fora single perspective image of a polyhedron," in IEEE Transactions on Pattern Analysis and Machine Intelligence, vol. 11, No. 6, pp. 545-554, Jun. 1989, doi: 10.1109/34.24790.*

Meyer, et al., "User-Guided Shape from Shading to Reconstruct Fine Details from a Single Photograph", Asian Conference on Computer Vision, 2007, 02 pages.

Lo, et al., "Capturing Facial Details by Space-time Shape-from-Shading", CGI 2008 Conference Proceedings, 2008, pp. 1-8.

* cited by examiner

SHAPE-REFINEMENT OF TRIANGULAR THREE-DIMENSIONAL MESH USING A MODIFIED SHAPE FROM SHADING (SFS) SCHEME

CROSS-REFERENCE TO RELATED APPLICATIONS/INCORPORATION BY REFERENCE

None.

FIELD

Various embodiments of the disclosure relate to three-dimensional (3D) modeling, virtual human technology, and virtual reality. More specifically, various embodiments of the disclosure relate to an electronic apparatus and method for shape-refinement of a triangular 3D mesh using a modified Shape from Shading (SFS) scheme.

BACKGROUND

Advancements in the field of three-dimensional (3D) computer graphics and 3D modeling have paved way for development and visualization of realistic 3D models of different types of objects, e.g., human face) in a 3D environment, such as a computer-generated imagery (CGI) environment. Typically, a 3D model of an object of interest may be rendered from a 3D mesh that uses polygonal surfaces to define a shape and geometry of the object of interest. In order to generate a realistic 3D model of the object of interest, the shape and color texture of the 3D model may need to be refined to match the actual texture and shape of the object of interest.

Typically, different objects have different reflecting properties associated with their respective surfaces. These properties result in different shading patterns on the surface of objects in images under a given lighting condition. For example, when modeling a 3D human face, to achieve realistic shape models, general shape is required to be accurately modeled as well as the facial details, such as wrinkles and moles. In some scenarios, a conventional Shape-From-Shading (SFS) method may be used to refine the shape of the 3D model. The conventional SFS method is a widely used method to refine the 3D model using an input image of the object and to reconstruct details, such as facial details. However, the SFS method usually requires non-linear optimization on a 3D triangular mesh of the object. This may lead to unnecessary time consumption and may be computationally inefficient, especially for a memory/processing constrained system.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and a method for shape-refinement of a triangular 3D mesh using a modified Shape from Shading (SFS) scheme, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for shape-refinement of a triangular three-dimensional (3D) mesh using a modified Shape from Shading (SFS) scheme. Exemplary aspects of the disclosure provide an electronic apparatus for the shape-refinement of the triangular 3D mesh of an object portion, such as a human facial portion. The disclosed electronic apparatus is configured to model details (e.g., facial details) of an initial triangular 3D mesh by using the modified SFS scheme. The initial triangular 3D mesh together with a corresponding texture map and a color image of the object portion may be used to estimate a final 3D triangular mesh as a shape-refined 3D triangular mesh from the initial triangular 3D mesh. Orthographic projection is adopted to project the initial triangular 3D mesh on a 2D image plane with square grids. A modified Shape from Shading (SFS) scheme is further applied to re-estimate the z-coordinate value for every vertex of the square grid. Then, the z-coordinate value for each vertex of the initial triangular 3D mesh is updated based on the results of the SFS scheme. The projection of the initial triangular 3D mesh to the 2D image plane, i.e. a mesh on square grids, is based on the orthographic projection. The values of depth, image intensity, and albedo for each vertex of the mesh grids are estimated by barycentric interpolation. The modified SFS scheme and a reflectance model, such as the Lambertian reflectance model, are further used to refine the depth value on each vertex of the square grids. The re-estimation of a shape-refined 3D triangular mesh from the mesh on square grids is performed by application of linear optimization models.

In general, for example, when modeling a 3D human face, to achieve realistic shape modeling, general shape is required to be accurately modeled as well as the facial details such as wrinkles, moles, and furrow lines. Existing SFS schemes which can refine a shape model (meshes) using an input image usually works on meshes on square grids, which usually simplifies optimization as a linear function.

There is a lack of efficient solutions for the existing SFS scheme for a triangular 3D mesh. In this disclosure, an efficient and modified SFS scheme that works for a triangular 3D mesh, is presented. The existing SFS scheme on a triangular 3D mesh usually solves a non-linear optimization problem directly, which is time consuming and computationally inefficient.

Figure 1:
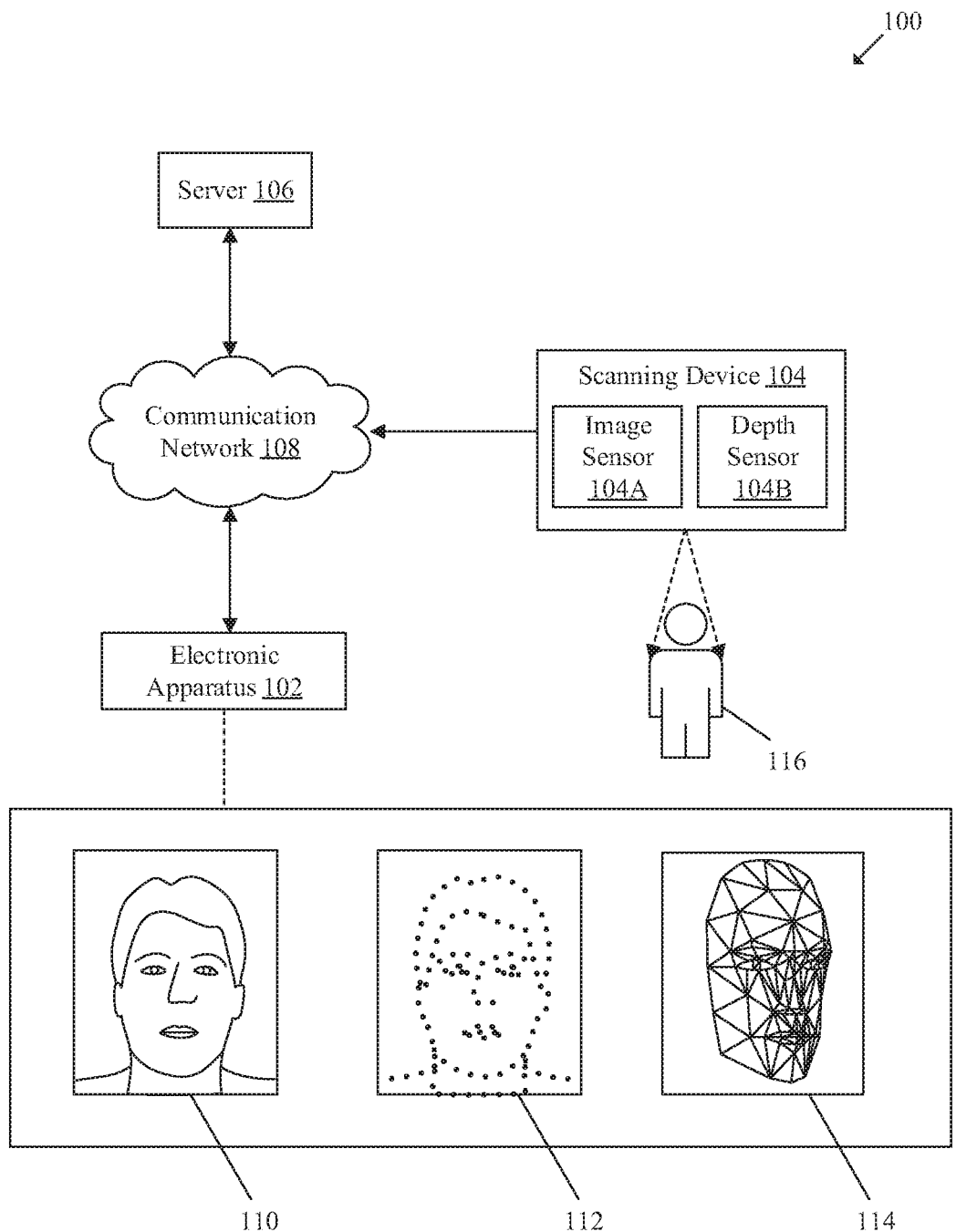
FIG. 1 is a block diagram that illustrates an exemplary network environment for shape-refinement of a triangular three-dimensional (3D) mesh using a modified Shape from Shading (SFS) scheme, in accordance with an embodiment of the disclosure.

FIG. 1 is a block diagram that illustrates an exemplary network environment for shape-refinement of a triangular 3D mesh using a modified Shape from Shading (SFS) scheme, in accordance with an embodiment of the disclosure. With reference to FIG. 1, there is shown a network environment 100. The network environment 100 may include an electronic apparatus 102, a scanning device 104, and a server 106. The scanning device 104 may include an image sensor 104A and a depth sensor 104B. The electronic apparatus 102, the scanning device 104, and the server 106 may be communicatively coupled to each other, via a communication network 108. Shown as an example, the electronic apparatus 102 may be configured to store a color image 110 of an object portion, such as a face portion, depth information 112 corresponding to the color image 110, and an initial three-dimensional (3D) triangular mesh 114 of the object portion, such as the face portion. There is further shown a user 116 who may be associated with the electronic apparatus 102 and/or the scanning device 104.

The electronic apparatus 102 may comprise suitable logic, circuitry, and interfaces that may be configured to generate a flat two-dimensional (2D) mesh of the object portion, based on an orthographic projection of the initial 3D triangular mesh 114 on an image plane that includes a plurality of square grid vertices. The generated flat 2D mesh may correspond to a mesh on square grids. The electronic apparatus 102 may be further configured to estimate a final grid depth value for each square grid vertex of the plurality of square grid vertices of the flat 2D mesh based on the modified SFS scheme. The electronic apparatus 102 may be further configured to estimate a final 3D triangular mesh as a shape-refined 3D triangular mesh based on the initial 3D triangular mesh 114 and the estimated final grid depth value for each square grid vertex of the plurality of square grid vertices. Examples of the electronic apparatus 102 may include, but are not limited to, a computing device, a video-conferencing system, a Virtual Reality (VR)-based device, an Augmented Reality (AR)-based device, a gaming device, a mainframe machine, a server, a computer workstation, and/or a consumer electronic (CE) device.

The scanning device 104 may comprise suitable logic, circuitry, and interfaces that may be configured to scan the object portion, such as a face portion of the user 116. The scanning device 104 may be configured to capture a plurality of color images and corresponding depth information of the object portion, such as the face of the user 116 from one or more viewing angles. The scanning device 104 may be further configured to transmit the captured plurality of color images and corresponding depth information to the electronic apparatus 102 and the server 106, via the communication network 108. The scanning device 104 may include a plurality of sensors, such as a combination of an image sensor (such as the image sensor 104A), a depth sensor (such as the depth sensor 104B), a color sensor, (such as a red-green-blue (RGB) sensor), and/or an infrared (IR) sensor which may be used to scan the object portion from different viewing angles. Examples of the scanning device 104 may include, but are not limited to, the depth sensor, the RGB sensor, the IR sensor, a 3D-mesh structure generator, an image sensor, or a motion-detector device.

In accordance with an embodiment, the scanning device 104 may include an active 3D scanner that relies on radiations or light to capture a 3D structure of the object portion in a 3D space. For example, the active 3D scanner may be a time-of-flight (TOF)-based 3D laser scanner, a laser rangefinder, a TOF camera, a hand-held laser scanner, a structured light 3D scanner, a modulated light 3D scanner, a CT scanner that outputs point cloud data, an aerial Light Detection And Ranging (LiDAR) laser scanner, a 3D LiDAR, a 3D motion sensor, and the like.

In FIG. 1, the scanning device 104 is shown as a separate device from the electronic apparatus 102. However, the disclosure may not be so limited and in some embodiments, the scanning device 104 may be integrated with the electronic apparatus 102. Alternatively, the entire functionality of the scanning device 104 may be incorporated in the electronic apparatus 102, without deviating from the scope of the present disclosure.

The server 106 may comprise suitable logic, circuitry, and interfaces that may be configured to store the plurality of color images and corresponding depth information captured by the scanning device 104. In accordance with an embodiment, the server 106 may be further configured to store the initial 3D triangular mesh 114. Examples of the server 106 may include, but are not limited to, a database server, a file server, a web server, a cloud server, an application server, a mainframe server, or other types of servers.

The communication network 108 may include a communication medium through which the electronic apparatus 102, the scanning device 104, and the server 106 may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the scanning device 104 may be configured to scan an object portion of an object-of-interest, such as a human, a robot, an animal, an animate object, an inanimate object, or any other type of object-of-interest. In an exemplary embodiment, the object-of-interest may correspond to the user 116 and the object portion may correspond to the face portion of the user 116. The scanning device 104 may be configured to scan the object portion, such as the face of the user 116, from one or more viewing angles while the object portion is in Field-of-View (FoV) of the scanning device 104.

For the scanning operation, the scanning device 104 may be further configured to capture the plurality of color images and the corresponding depth information of the object portion. The plurality of color images and the corresponding depth information may be captured at the same time (i.e. time-synchronized), while the FoV for each of the plurality of color images is aligned with that of a corresponding portion of the depth information of the object portion. The depth information corresponding to the plurality of color images may include information about "Z" coordinates of the object portion, such as the face portion of the user 116 in 3D space. The plurality of color images and the corresponding depth information may provide an enhanced understanding of different shape features and depth of each region of object portion from a 3D perspective. In some embodiments, each color image and corresponding depth portion of the depth information may be captured at a high-resolution (e.g., Full High Definition (FHD), Ultra HD (UHD), etc.) and may collectively retain all the necessary shape and texture—related details of the object portion.

As an example, the image sensor 104A may be configured to capture the plurality of color images of the face of the user 116 from the one or more viewing angles. Similarly, the depth sensor 104B may be configured to capture depth information corresponding to the plurality of color images of the face of the user 116. Each color image of the captured plurality of color images may have a corresponding depth image. The depth information corresponding to the plurality of color images may indicate information about depths of different regions of the object portion, such as the face of the user 116. As an example, different regions of the face portion having wrinkles may have different depth values as compared to other regions without wrinkles. These different regions having wrinkles may be prominent regions that may require accurate shape-refinement while 3D modelling.

The scanning device 104 may be further configured to transmit the plurality of color images and the corresponding depth information to the electronic apparatus 102 and the server 106, via the communication network 108. The electronic apparatus 102 may be configured to store the color image 110 of the plurality of color images and the depth information 112 corresponding to the color image 110. Also, the electronic apparatus 102 may be further configured to store the initial 3D triangular mesh 114 of the object portion, such as the face of the user 116. The initial 3D triangular mesh 114 may be a pre-estimated 3D triangular mesh which may correspond to a shape-unrefined triangular mesh of the object portion. The shape-unrefined triangular mesh may include different vertices for which corresponding depth values mismatch a true depth value of a corresponding point on the object portion. The shape of some portions of the object portion may be inaccurately captured in the initial 3D triangular mesh 114 and may not represent an actual/realistic shape of the object portion. As an example, intricate shape-features, such as wrinkles, furrow lines, or moles may be either absent or partially captured in the initial 3D triangular mesh 114 of a face portion of the user 116.

In some embodiments, the initial 3D triangular mesh 114 may be stored on a server, such as the server 106. In such cases, the electronic apparatus 102 may be configured to retrieve the initial 3D triangular mesh 114 from the server 106, via the communication network 108. In some other embodiments, the electronic apparatus 102 may be configured to generate the initial 3D triangular mesh 114 of the object portion, based on the captured plurality of color images and the corresponding depth information.

The electronic apparatus 102 may be further configured to generate a flat 2D mesh based on an orthographic projection of the initial 3D triangular mesh 114 on an image plane. The image plane may be a 2D plane that includes a plurality of square grid vertices. The flat 2D mesh may be a 2D correspondence of the initial 3D triangular mesh 114 projected onto the 2D plane and may represent the initial 3D triangular mesh 114 in 2D space. Each vertex of the initial 3D triangular mesh 114 may be represented in terms of a 3D coordinate (i.e. x, y, and z coordinate values). Similarly, each projected point on the flat 2D mesh for a corresponding vertex of the initial 3D triangular mesh 114 may be represented in terms of a 2D coordinate (i.e. x and y coordinate values). The (x, y) coordinate values for each projected point on the image plane may be same as the (x, y) coordinate values for a corresponding vertex of the initial 3D triangular mesh 114.

As the application of a conventional SFS scheme on the initial 3D triangular mesh 114 may require a non-linear optimization, it may be time consuming to re-estimate a depth value for each vertex of the initial 3D triangular mesh 114, based on the application of the conventional SFS scheme. The flat 2D mesh may be generated to re-estimate a depth value of each vertex of the initial 3D triangular mesh 114. The depth value of each vertex of the initial 3D triangular mesh 114 may be re-estimated based on application of the modified SFS on the flat 2D mesh. The application of the modified SFS on the flat 2D mesh simplifies the re-estimation process as a linear optimization problem. Also, the re-estimation of the depth value of each vertex of the initial 3D triangular mesh 114 based on application of the modified SFS on the flat 2D mesh, takes less computing time as compared to the conventional SFS scheme.

Typically, different vertices of the initial 3D triangular mesh 114 may need a position correction (such as a depth correction) to be applied on different vertices of the initial 3D triangular mesh 114. This may be needed as the initial 3D triangular mesh 114 may have inaccurate surface orientations and the goal of the present disclosure is to obtain a shape-refined 3D triangular mesh that precisely models different shape features, such as wrinkles, models, and furrow lines, of the object portion. The position correction may be required to recover an orientation of the surface (or a surface patch) of a 3D model that may be rendered from the initial 3D triangular mesh 114. The present disclosure uses a single color image of the object portion and a modified Shape from Shading (SFS) scheme to apply the position correction to different vertices of the initial 3D triangular mesh 114 and obtains the shape-refined 3D triangular mesh. The goal of using the modified SFS scheme is to estimate surface normals and furthermore to estimate correct position values for different vertices of the initial 3D triangular mesh 114.

The electronic apparatus 102 may be configured to estimate a set of initial depth values for a corresponding set of vertices of a corresponding triangle of the initial 3D triangular mesh 114. The set of initial depth values may be estimated based on a corresponding set of 3D coordinates for the corresponding set of vertices of the corresponding triangle of the initial 3D triangular mesh 114. The set of initial depth values may be a set of Z-coordinate values of the corresponding set of vertices of the corresponding triangle of the initial 3D triangular mesh 114.

The electronic apparatus 102 may be further configured to estimate an initial grid depth value of each square grid vertex of the plurality of square grid vertices based on a barycentric interpolation of the estimated set of initial depth values for the corresponding set of vertices of the corresponding triangle of the initial 3D triangular mesh 114. The estimation of the initial grid depth value of each square grid vertex of the plurality of square grid vertices is further described in detail, for example, in FIGS. 3 and 4.

The electronic apparatus 102 may be configured to estimate a final grid depth value for each square grid vertex of the plurality of square grid vertices of the flat 2D mesh, based on the modified SFS scheme. The modified SFS scheme may correspond to an objective relationship among a reference grid image intensity value, the initial grid depth value, and a grid albedo value for each square grid vertex of the plurality of square grid vertices on the image plane. The final grid depth value of each square grid vertex of the plurality of square grid vertices may be a re-estimated depth value for each square grid vertex of the plurality of square grid vertices. The final depth value may be estimated further based on the lighting conditions of the color image 110 of the object portion, such as the face of the user 116. The lighting conditions may be defined using a reflectance model, such as the Lambertian reflectance model. In some embodiments, only the diffused reflection may be considered as the lighting conditions of the color image 110. The estimation of the final grid depth value for each square grid vertex of the plurality of square grid vertices of the flat 2D mesh is further described in detail, for example, in FIG. 3.

The electronic apparatus 102 may be further configured to estimate a final 3D triangular mesh as a shape-refined 3D triangular mesh based on the initial 3D triangular mesh 114 and the estimated final grid depth value for each square grid vertex of the plurality of square grid vertices. The shape of the estimated final 3D triangular mesh may resemble the actual shape of the object portion, such as the face of the user 116. The electronic apparatus 102 may be further configured to control a display device to render a 3D model of the object portion based on the estimated the final 3D triangular mesh. The 3D model of the object portion may realistically represent the surface features of object portion. In some exemplary scenarios, the 3D model may be further rendered in a Virtual Reality (VR) or Augmented Reality (AR) environment to represent the object portion, such as the face portion of the user 116. The application of the 3D model of the object portion may include animations in video games, Visual Effects (VFX), Computer-Generated Imagery (CGI), and a 3D model-based video conferencing.

Figure 2:
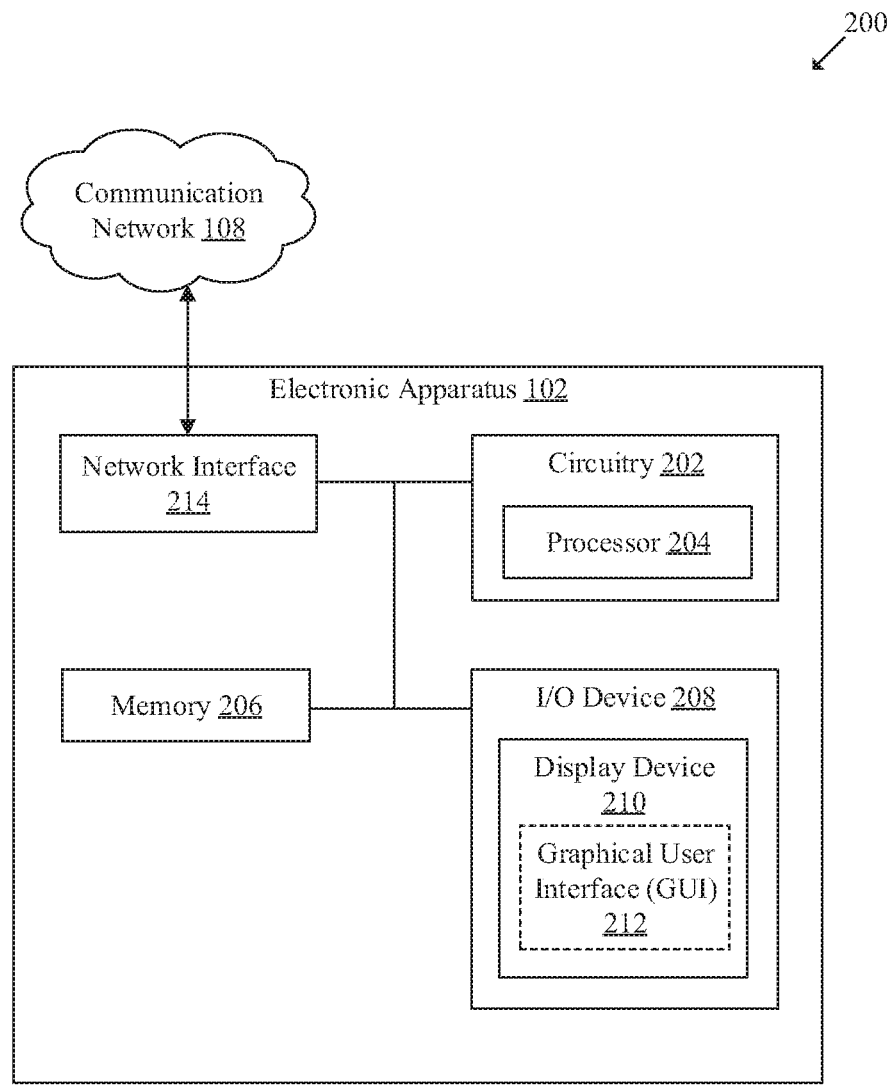
FIG. 2 is a block diagram of an exemplary electronic apparatus for shape-refinement of a triangular 3D mesh using a modified SFS scheme, in accordance with an embodiment of the disclosure.

FIG. 2 is a block diagram of an exemplary electronic apparatus for shape-refinement of a triangular 3D mesh using a modified SFS scheme, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202. The circuitry 202 may further include one or more processors, such as a processor 204. The electronic apparatus 102 may further include a memory 206, an input/output (I/O) device 208, and a network interface 214. The I/O device 208 may include a display device 210, which may be utilized to render a Graphical User Interface (GUI) 212. The circuitry 202 may be communicatively coupled to the memory 206 and the I/O device 208. The circuitry 202 may be configured to communicate with the scanning device 104 and the server 106, by use of the network interface 214.

The processor 204 may comprise suitable logic, circuitry, and interfaces that may be configured to execute instructions stored in the memory 206. The processor 204 may be configured to generate the flat 2D mesh of the object portion, based on the initial 3D triangular mesh 114 and estimate a final grid depth value for each square grid vertex of the plurality of square grid vertices of the flat 2D mesh based on the modified SFS scheme. The processor 204 may be further configured to estimate a final 3D triangular mesh as a shape-refined 3D triangular mesh based on the estimated final grid depth value for each square grid vertex of the plurality of square grid vertices and the initial 3D triangular mesh 114. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 206 may comprise suitable logic, circuitry, and interfaces that may be configured to store the instructions to be executed by the processor 204. The memory 206 may be further configured to store the initial 3D triangular mesh 114. The memory 206 may be further configured to store the color image 110 and the depth information 112 corresponding to the color image 110. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may comprise suitable logic, circuitry, and interfaces that may be configured to receive an input from a user (such as the user 116) and provide an output to the user based on the received input from the user. The I/O device 208 which may include various input and output devices, may be configured to communicate with the circuitry 202. Examples of the I/O device 208 may include, but are not limited to, a touch screen, a keyboard, a mouse, a joystick, a microphone, a display device (for example, the display device 210), and a speaker.

The display device 210 may comprise suitable logic, circuitry, and interfaces that may be configured to display a 3D model of the object portion based on a shape-refinement of the initial 3D triangular mesh 114 of the object portion. In some embodiments, the display device 210 may be an external display device associated with the electronic apparatus 102. In some embodiments, the display device 210 may be a touch screen which may enable a user, such as the user 116, to provide a user input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display.

The GUI 212 may correspond to a user interface (UI) rendered on a display device, such as the display device 210. The GUI 212 may be configured to display a 3D model of the object portion. In some embodiments, the GUI 212 may be rendered on an external display screen that may be communicatively coupled to the electronic apparatus 102. The GUI 212 may include different GUI and non-GUI elements which may be used to display information and control (or interact with) the display of the 3D model and/or information associated with the displayed 3D model.

The network interface 214 may comprise suitable logic, circuitry, and interfaces that may be configured to facilitate communication between the electronic apparatus 102, the scanning device 104, and the server 106 via the communication network 108. The network interface 214 may be implemented by use of various known technologies to support wired or wireless communication of the electronic apparatus 102 with the communication network 108. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 214 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The operation of the circuitry 202 is described in detail, for example in FIG. 3 and FIG. 4.

Figure 3:
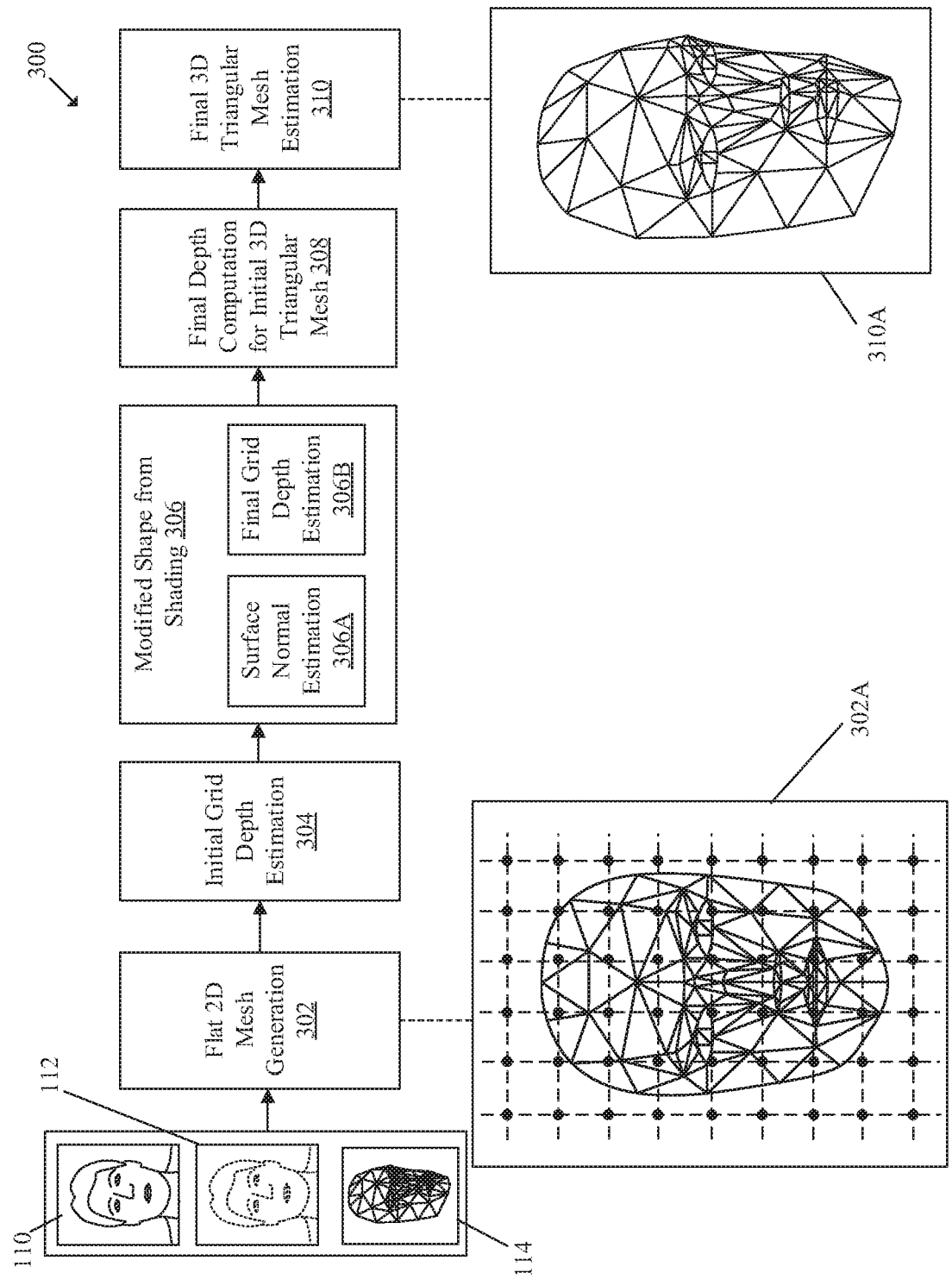
FIG. 3 illustrates exemplary operations for shape-refinement of a triangular 3D mesh using a modified SFS scheme, in accordance with an embodiment of the disclosure.

FIG. 3 illustrates exemplary operations for shape-refinement of a triangular 3D mesh using a modified SFS scheme, in accordance with an embodiment of the disclosure. FIG. 3 is described in conjunction with elements from FIG. 1 and FIG. 2. With reference to FIG. 3, there is shown a sequence of exemplary operations as part of a processing pipeline 300 for shape-refinement of the initial 3D triangular mesh 114.

At 302, a flat 2D mesh generation operation may be executed. In the flat 2D mesh generation operation, the processor 204 may be configured to retrieve the initial 3D triangular mesh 114 from the memory 206. In some embodiments, the processor 204 may be configured to retrieve the initial 3D triangular mesh 114 from the server 106, via the communication network 108.

The processor 204 may be further configured to generate a flat 2D mesh 302A based on the orthographic projection of the initial 3D triangular mesh 114 on the image plane. As an example, the image plane may correspond to a front view of the object portion, such as the face of the user 116. The orthographic projection may be utilized to project the initial 3D triangular mesh 114 on the image plane in a 2D space. The flat 2D mesh 302A may be made of a plurality of polygons (for example, square grid mesh). The flat 2D mesh 302A may include a plurality of square grid vertices and may represent a projection of the surface of the object portion.

At 304, an initial grid depth estimation operation may be executed. In the initial grid depth estimation operation, the processor 204 may be configured to estimate the initial grid depth value for each square grid vertex of the plurality of square grid vertices of the flat 2D mesh 302A. The process of estimation of the initial grid depth value is described herein.

Initially, the processor 204 may be configured to estimate a set of initial depth values for a corresponding set of vertices of a corresponding triangle of the initial 3D triangular mesh 114. The set of initial depth values for the corresponding set of vertices of the corresponding triangle of the initial 3D triangular mesh 114 may be estimated based on the corresponding set of 3D coordinates for the corresponding set of vertices of the corresponding triangle of the initial 3D triangular mesh 114. As an example, the processor 204 may be configured to estimate the set of initial depth values for a first vertex, a second vertex, and a third vertex of a first triangle of the initial 3D triangular mesh 114. The set of initial depth values may include a Z-coordinate value for each of the first vertex, the second vertex, and the third vertex of the first triangle. The estimation of the Z-coordinate value for each of the first vertex, the second vertex, and the third vertex of the first triangle may be performed based on the corresponding 3D coordinates of the first vertex, the second vertex, and the third vertex of the first triangle.

The processor 204 may be further configured to estimate the initial grid depth value for each square grid vertex of the plurality of square grid vertices of the flat 2D mesh 302A. The initial grid depth value may be estimated for each square grid vertex of the plurality of square grid vertices, based on a barycentric interpolation of the estimated set of initial depth values for the corresponding set of vertices of the corresponding triangle of the initial 3D triangular mesh 114. As an example, the processor 204 may be configured to estimate the initial grid depth value for a first square grid vertex of the plurality of square grid vertices based on the barycentric interpolation of the estimated set of initial depth values for the corresponding set of vertices of the corresponding first triangle of the initial 3D triangular mesh 114. The initial grid depth value for the first square grid vertex may correspond to a barycentric coordinate of the first triangle of the initial 3D triangular mesh 114.

The processor 204 may be further configured to estimate a set of reference image intensity values for a corresponding set of vertices of a corresponding triangle of the initial 3D triangular mesh 114. The set of reference image intensity values may be estimated based on a projection of the corresponding set of vertices on the color image 110 of the object portion. As an example, the processor 204 may be configured to estimate the set of reference image intensity values for the first vertex, the second vertex, and the third vertex of the first triangle of the initial 3D triangular mesh 114. The set of reference image intensity values of the first vertex, the second vertex, and the third vertex of the first triangle may be intensity values at corresponding projected positions of the first vertex, the second vertex, and the third vertex of the first triangle on the color image 110.

The processor 204 may be further configured to estimate a reference grid image intensity value for each square grid vertex of the plurality of square grid vertices. The reference grid image intensity value for each square grid vertex may be estimated based on a barycentric interpolation of the estimated set of reference image intensity values for the corresponding set of vertices of the corresponding triangle of the initial 3D triangular mesh 114. As an example, the processor 204 may be configured to estimate the reference grid image intensity value for the first square grid vertex of the plurality of square grid vertices, based on the barycentric interpolation of the estimated set of reference image intensity values for the corresponding first vertex, second vertex, and the third vertex of the corresponding first triangle of the initial 3D triangular mesh 114.

The processor 204 may be further configured to estimate a set of albedo values for a corresponding set of vertices of a corresponding triangle of the initial 3D triangular mesh 114. The set of albedo values for the corresponding set of vertices of the corresponding triangle may be estimated, based on a texture map of the object portion, such as the face of the user 116. As an example, the processor 204 may be configured to estimate the set of albedo values for the first vertex, the second vertex, and the third vertex of the first triangle of the initial 3D triangular mesh 114. The set of albedo values may be a measure of a real color of the surface of the object portion without a lighting influence from any external light sources. An albedo value for the first vertex, the second vertex, and the third vertex of the first triangle may be extracted from a corresponding vertex of the texture map. Further, the texture map may represent texture information or color information of the object portion. The texture map may be based on a reflectance model. The reflectance model may be an empirical model for illumination of points on a surface. An example of the reflectance model may be a Lambertian reflectance model, in which the diffuse reflection of the object portion in the color image 110 is modelled. The reflectance model may illustrate a way a surface (e.g. the face of the user 116) may reflect light based on the diffuse reflection. The reflectance model may be represented, for example, using equation (1), as follows:

$$I = \rho \vec{l} \vec{Y}(n) \quad (1)$$

where, $\vec{l}$ represents coefficients of the harmonic expansion of lighting conditions on the surface of the object portion;
n represents a surface normal of each of the plurality of points on the surface of the object portion;
$\vec{Y}(n)$ represents surface spherical harmonics bases evaluated at the surface normal of the plurality of points; and
ρ represents the albedo value at each of the plurality points. A simplified form of the equation (1) may be represented, for example, by equation (2), as follows:

$$I = \rho \max(\omega \cdot [1, n^T]^T, 0) \quad (2)$$

where,

ρ represents the albedo value at each of the plurality points;
ω represents a lighting direction and a lighting strength on the surface of the object portion; and
$[1, n^T]^T$ represents a first order approximation of the surface spherical harmonics.

The processor 204 may be further configured to estimate a grid albedo value for each square grid vertex of the plurality of square grid vertices based on a barycentric interpolation of the estimated set of albedo values for the corresponding set of vertices of the corresponding triangle of the initial 3D triangular mesh 114. As an example, the processor 204 may be configured to estimate the grid albedo value for the first square grid vertex of the plurality of square grid vertices based on the barycentric interpolation of the estimated set of albedo values for the corresponding first vertex, second vertex, and the third vertex of the corresponding first triangle of the initial 3D triangular mesh 114. The grid albedo value of the first square grid vertex may correspond to a measure of a real color value of a point on the corresponding first triangle of initial 3D triangular mesh 114 without a lighting influence from any external light sources.

At 306, a modified SFS scheme application operation may be executed. In the modified SFS scheme application operation, the processor 204 may be configured to apply a modified SFS scheme on the flat 2D mesh 302A. The modified SFS scheme may correspond to an objective relationship among the reference grid image intensity value, the initial grid depth value, and the grid albedo value for each square grid vertex of the plurality of square grid vertices. The modified SFS operation may include a surface normal estimation operation and a final grid depth estimation.

At 306A, the surface normal estimation operation is executed. In the surface normal estimation operation, the processor 204 may be configured to estimate a surface normal for each square grid vertex of the plurality of square grid vertices of the flat 2D mesh 302A. The surface normal for each square grid vertex of the plurality of square grid vertices of the flat 2D mesh 302A may be estimated based on 2D coordinates for each square grid vertex of the plurality of square grid vertices and the initial grid depth value for each square grid vertex of the plurality of square grid vertices. The surface normal for each square grid vertex may be estimated, for example, using equation (3), equation (4), and equation (5), given as follows:

$$n(v') = n(x, y) = \frac{1}{\sqrt{p^2 + q^2 + 1}} (p, q, -1)^T \quad (3)$$

$$p(x, y) = \frac{\partial z}{\partial y} = z(x+1) - z(x) \quad (4)$$

$$q(x, y) = \frac{\partial z}{\partial y} = z(y+1) - z(y) \quad (5)$$

where, p represents a gradient of a depth value along the X-axis;
q represents a gradient of a depth value along the Y-axis;
n(v') represents the surface normal for each square grid vertex of the plurality of square grid vertices of the flat 2D mesh 302A;
x represents the X-coordinate of each square grid vertex of the plurality of square grid vertices of the flat 2D mesh 302A; and
y represents the Y-coordinate of each square grid vertex of the plurality of square grid vertices of the flat 2D mesh 302A.

At 306B, a final grid depth estimation operation may be executed. In the final grid depth estimation operation, the processor 204 may be configured to estimate a final grid depth value for each square grid vertex of the plurality of square grid vertices of the flat 2D mesh 302A. The final grid depth value for each square grid vertex may be estimated based on a minimization (or optimization) of the objective relationship for a color difference between an image rendered using a surface normal, an albedo, and a lighting on the surface of the object portion and the color image 110 of the object portion. The objective relationship may be represented, for example, by equation (6), as follows:

$$E_{shading}(z') = \sum_v |I - \rho w[1, n(v')^T]^T|^2 + \alpha |z - z'|^2 + \beta (\Delta G^*(z - z'))^2 \quad (6)$$

where,

I represents the color image 110;
z' represents the final grid depth value of each square grid vertex of the plurality of square grid vertices;
n(v') represents the surface normal for each square grid vertex of the plurality of square grid vertices;
$\alpha |z-z'|^2$ represents a first smoothening term; and
$\beta(\Delta G^*(z-z'))^2$ represents a second smoothening term; and
$\Delta G^*$ represents Laplacian of a Gaussian.

During optimization of the objective relationship represented by equation (6), the term "$p^2+q^2+1$" of the equation (3) may be considered as a constant when the set of initial depth values for the corresponding set of vertices may be considered to calculate "p" and "q". Further, during optimization of the objective relationship, a first order approximation of the surface spherical harmonics (i.e. $[1, n(v')^T]^T$) as represented in equation (6)) may be considered. As a result, the objective function may be simplified as a linear optimization problem, instead of a conventional non-linear optimization problem.

At 308, a final depth computation operation for the initial 3D triangular mesh 114 may be executed. In the final depth computation operation, the processor 204 may be configured to compute a set of final depth values for a corresponding set of vertices of a corresponding triangle of the initial 3D triangular mesh 114, based on the estimated final grid depth value for a corresponding square grid vertex that lies within the corresponding triangle. The set of final depth values may be further estimated for each triangle of a plurality of triangles of the initial 3D triangular mesh 114. As an example, the processor 204 may be configured to compute the set of final depth values for a corresponding set of vertices of a first triangle, based on the estimated final grid depth value of a first square grid vertex that lies within the corresponding first triangle.

At 310, a final 3D triangular mesh estimation operation may be executed. In the final 3D triangular mesh estimation, the processor 204 may be further configured to estimate a final 3D triangular mesh 310A as a shape-refined 3D triangular mesh based on the initial 3D triangular mesh 114 and the computed set of final depth values for the corresponding set of vertices of the corresponding triangle of the initial 3D triangular mesh 114. The set of final depth values may be computed based on the estimated final grid depth value for corresponding square grid vertex that lies within the corresponding triangle.

The details of the estimation of the final 3D triangular mesh 310A is described herein. The processor 204 may be further configured to update the set of initial depth values for the corresponding set of vertices of the corresponding triangle of the initial 3D triangular mesh 114, based on the computed set of final depth values for the corresponding set of vertices of the corresponding triangle of the initial 3D triangular mesh 114. In order to update set of initial depth values for the corresponding set of vertices of the corresponding triangle of the initial 3D triangular mesh 114, an optimization problem may be formulated for the result of the modified SFS scheme. The set of final depth values (estimated at 308) may be referred to as the result for the modified SFS scheme. The optimization problem may be associated with an objective function. The set of initial depth values for the corresponding set of vertices of the corresponding triangle of the initial 3D triangular mesh 114 may be updated based on a minimization of the objective function.

The objective function may include a relationship between the initial grid depth value and the final grid depth value for a corresponding square grid vertex that lies within the corresponding triangle and a squared difference between final depth values for each vertex and adjacent vertex on the corresponding triangle. The objective function may be represented, for example, by equation (7), given as follows:

$$\min_z \sum_{k=1}^{M} (z_{ortho,k} - \tilde{z}_{ortho,k})^2 + \sum_{i,j \in N} (z_i - z_j)^2 \quad (7)$$

where,
$z_{ortho,k}$ represents an initial grid depth value of a square grid vertex "k";
$\tilde{z}_{ortho,k}$ represents a final grid depth value of the square grid vertex "k";

$z_i$ represents a depth value of a grid vertex "i" on the corresponding triangle; and
$z_j$ represents a depth value of a grid vertex "j" on the corresponding triangle. In accordance with an embodiment, the set of final depth values may be represented as a linear combination of the set of final depth values of the plurality of square grid vertices and a coefficient of a set of barycentric interpolation parameters that may be determined while estimating the initial grid depth value for each square grid vertex of the plurality of square grid vertices.

Figure 4:
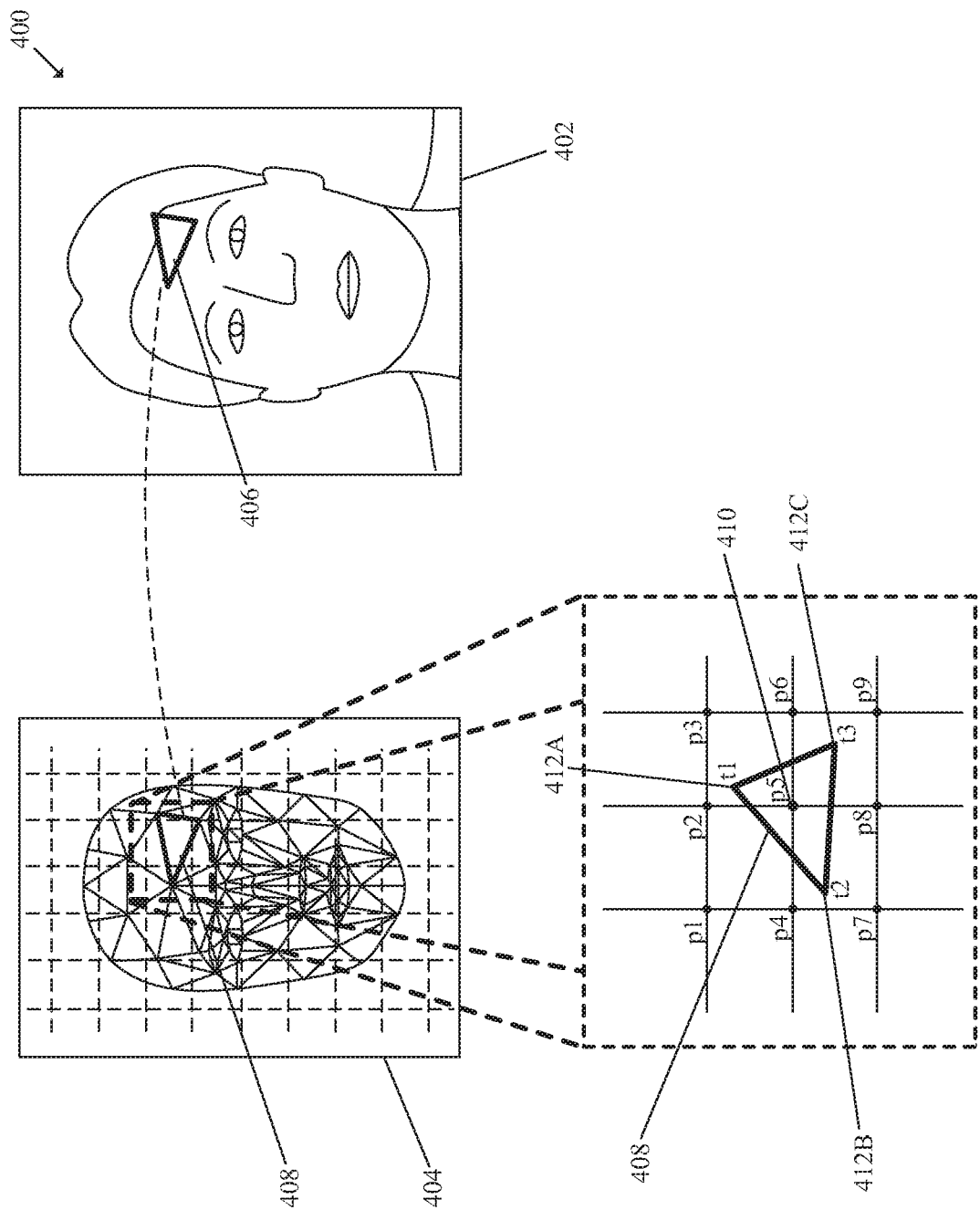
FIG. 4 illustrates an exemplary scenario for estimation of initial grid depth values, image intensity values, and albedo values for a square grid vertex that lies on an image plane, in accordance with an embodiment of the disclosure.

FIG. 4 illustrates an exemplary scenario for estimation of initial grid depth values, image intensity values, and albedo values for a square grid vertex that lies on an image plane, in accordance with an embodiment of the disclosure. FIG. 4 is explained in conjunction with elements from FIGS. 1, 2, and 3. With reference to FIG. 4, there is shown an exemplary scenario 400 for estimation of initial grid depth values of a plurality of square grid vertices that lie on an image plane. In the exemplary scenario 400, there is shown a color image 402, a flat 2D mesh 404, a first triangle 406 on the color image 402, and a second triangle 408 on the flat 2D mesh 404. The flat 2D mesh 404 may correspond to the flat 2D mesh 302A of FIG. 3. There is further shown a first square grid vertex 410 (also represented by "p5"), a first vertex 412A (also represented by "t1"), a second vertex 412B (also represented by "t2"), and a third vertex 412C (also represented by "t3"). The first vertex 412A, the second vertex 412B, and the third vertex 412C may belong to a corresponding triangle of an initial 3D triangular mesh.

The processor 204 may be configured to map the first triangle 406 on the color image 402 to the second triangle 408 on the flat 2D mesh 404. The first triangle 406 may be mapped to the second triangle 408 based on a projection of the color image 402 onto an image plane. The processor 204 may be further configured to estimate the set of initial depth values for a corresponding set of vertices of the second triangle 408, based on a set of 3D coordinates of the corresponding set of vertices of the second triangle 408. For example, the processor 204 may be configured to estimate an initial depth value of each of the first vertex 412A (as represented by "t1"), the second vertex 412B (as represented by "t2"), and the third vertex 412C (as represented by "t3") of the second triangle 406, based on the color image 402 and the depth information.

The processor 204 may be further configured to estimate an initial grid depth value of the first square grid vertex 410 (as represented by "p5"), based on a barycentric interpolation of the estimated set of initial depth values corresponding to the first vertex 412A (as represented by "t1"), the second vertex 412B (as represented by "t2"), and the third vertex 412C (as represented by "t3").

The processor 204 may be further configured to estimate the set of reference image intensity values for the corresponding set of vertices of the second triangle 408, based on a projection of the corresponding set of vertices on the color image 402. For example, the processor 204 may be configured to estimate a reference image intensity value for each of the first vertex 412A (as represented by "t1"), the second vertex 412B (as represented by "t2"), and the third vertex 412C (as represented by "t3") of the second triangle 408.

The processor 204 may be further configured to estimate a reference grid image intensity value for the first square grid vertex 410 (as represented by "p5"), based on the barycentric interpolation of the estimated set of reference image intensity values corresponding to the first vertex 412A (as represented by "t1"), the second vertex 412B (as represented by "t2"), and the third vertex 412C (as represented by "t3").

The processor 204 may be further configured to estimate the set of albedo values for the set of vertices of the second triangle 408, based on the texture map of the object portion, such as the face of the user 116. For example, the processor 204 may be configured to estimate an albedo value for each of the first vertex 412A (as represented by "t1"), the second vertex 412B (as represented by "t2"), and the third vertex 412C (as represented by "t3") of the second triangle 408. The processor 204 may be further configured to estimate a grid albedo value for the first square grid vertex 410 (as represented by "p5"), based on the barycentric interpolation of the estimated set of albedo values for the first vertex 412A (as represented by "t1"), the second vertex 412B (as represented by "t2"), and the third vertex 412C (as represented by "t3").

Figure 5:
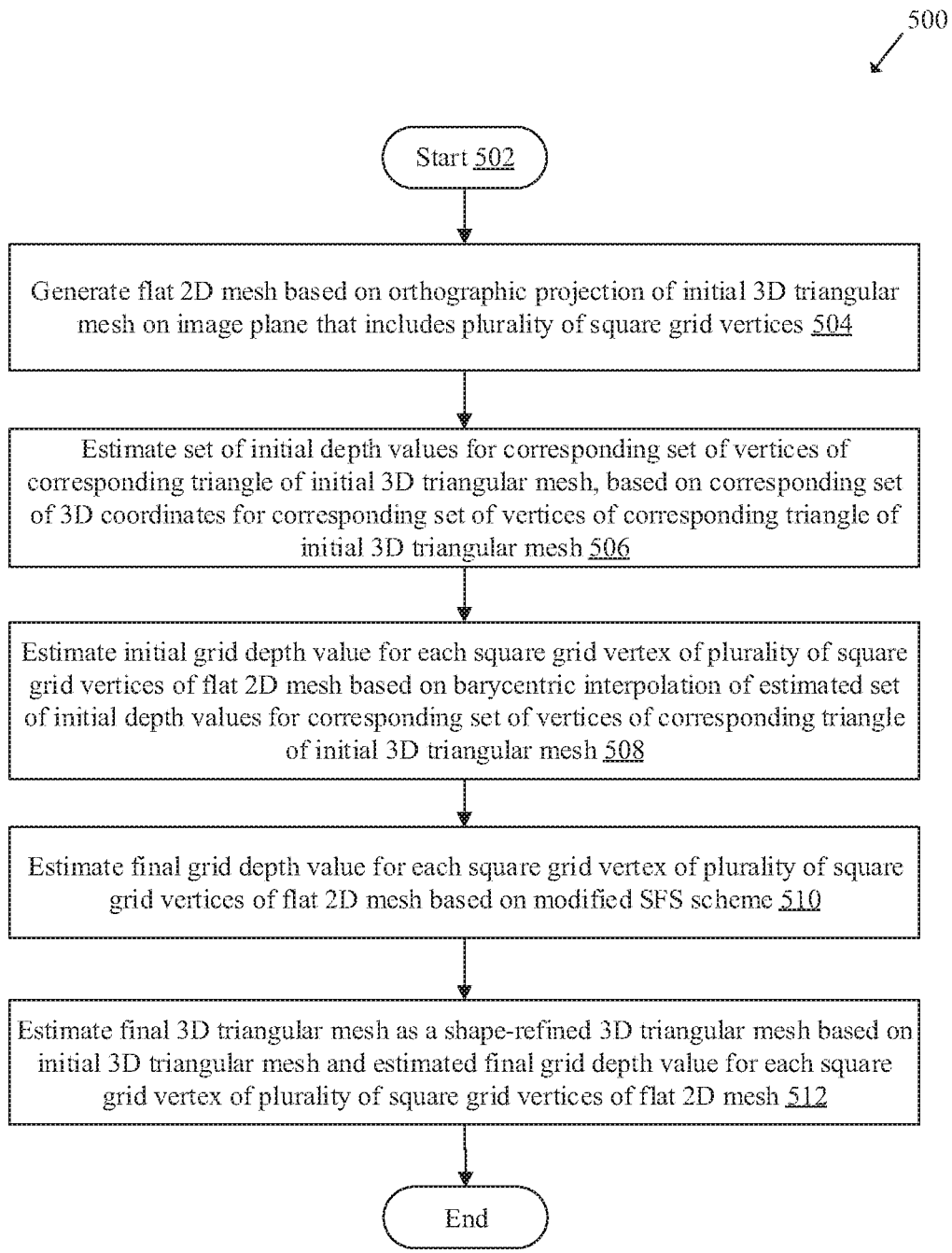
FIG. 5 is a flowchart that illustrates an exemplary method for shape-refinement of a triangular 3D mesh using a modified SFS scheme, in accordance with an embodiment of the disclosure.

FIG. 5 is a flowchart that illustrates an exemplary method for shape-refinement of a triangular 3D mesh using a modified SFS scheme, in accordance with an embodiment of the disclosure. FIG. 5 is described in conjunction with elements from FIGS. 1, 2, 3, and 4. With reference to FIG. 5, there is shown a flowchart 500. The operations of the flowchart 500 may be executed in the electronic apparatus 102. The operations may start at 502 and proceed to 504.

At 504, the flat 2D mesh 302A may be generated based on the orthographic projection of the initial 3D triangular mesh 114 on the image plane that includes the plurality of square grid vertices. The processor 204 may be configured to generate the flat 2D mesh 302A based on the orthographic projection of the initial 3D triangular mesh 114 on the image plane. The flat 2D mesh 302A may represent the initial 3D triangular mesh 114 in the 2D space. The generation of the flat 2D mesh 302A is described, for example, in FIGS. 1 and 3.

At 506, a set of initial depth values for a corresponding set of vertices of a corresponding triangle of the initial 3D triangular mesh 114 may be estimated based on a corresponding set of 3D coordinates for the corresponding set of vertices of the corresponding triangle of the initial 3D triangular mesh 114. The processor 204 may be configured to estimate the set of initial depth values for the corresponding set of vertices of the corresponding triangle of the initial 3D triangular mesh 114. The set of initial depth values for the corresponding set of vertices of the corresponding triangle may be estimated based on the corresponding set of 3D coordinates for the corresponding set of vertices of the corresponding triangle of the initial 3D triangular mesh 114 of the object portion, such as the face of the user 116. The estimation of the set of initial depth values is described, for example, in FIG. 3.

At 508, the initial grid depth value for each square grid vertex of the plurality of square grid vertices of the flat 2D mesh 302A may be estimated based on the barycentric interpolation of the estimated set of initial depth values for the corresponding set of vertices of the corresponding triangle of the initial 3D triangular mesh 114. The processor 204 may be configured to estimate the initial grid depth value for each square grid vertex of the plurality of square grid vertices. The estimation of the initial grid depth value of each square grid vertex of the plurality of square grid vertices is described, for example, in FIGS. 3 and 4.

At 510, the final grid depth value for each square grid vertex of the plurality of square grid vertices of the flat 2D mesh 302A may be estimated based on the modified SFS scheme. The processor 204 may be configured to estimate the final grid depth value for each square grid vertex of the plurality of square grid vertices of the flat 2D mesh 302A based on the modified SFS scheme. The final grid depth value of each square grid vertex of the plurality of square grid vertices may be the re-estimated depth value for each square grid vertex of the plurality of square grid vertices of the flat 2D mesh 302A. The estimation of the final grid depth value for each square grid vertex of the plurality of square grid vertices of the flat 2D mesh 302A is described, for example, in FIG. 3.

At 512, a final 3D triangular mesh 310A as a shape-refined 3D triangular mesh may be estimated based on the initial 3D triangular mesh 114 and the estimated final grid depth value for each square grid vertex of the plurality of square grid vertices of the flat 2D mesh 302A. The processor 204 may be configured to estimate the final 3D triangular mesh 310A as the shape-refined 3D triangular mesh of the object portion, such as the face of the user 116, based on the initial 3D triangular mesh 114 and the estimated final grid depth value for each square grid vertex of the plurality of square grid vertices of the flat 2D mesh 302A. The final 3D triangular mesh 310A may represent the actual shape and surface features of the object portion. The estimation of the final 3D triangular mesh 310A is described, for example, in FIG. 3. The control may pass to end.

Various embodiments of the disclosure may provide a non-transitory, computer-readable medium and/or storage medium, and/or a non-transitory machine readable medium and/or storage medium stored thereon, instructions executable by a machine and/or a computer, such as the electronic apparatus 102, for shape-refinement of a triangular 3D mesh using a modified SFS scheme. The at least one code section may cause the machine and/or computer to perform operations that include generation of a flat 2D mesh based on an orthographic projection of an initial three-dimensional (3D) triangular mesh on an image plane that includes a plurality of square grid vertices. The initial 3D triangular mesh may correspond to a shape-unrefined triangular mesh of an object portion. The operations further include estimation of a final grid depth value for each square grid vertex of the plurality of square grid vertices of the flat 2D mesh based on a modified shape from shading (SFS) scheme. The modified SFS scheme may correspond to an objective relationship among a reference grid image intensity value, an initial grid depth value, and a grid albedo value for each square grid vertex of the plurality of square grid vertices. The operations further include estimate a final 3D triangular mesh as a shape-refined 3D triangular mesh based on the initial 3D triangular mesh and the estimated final grid depth value for each square grid vertex of the plurality of square grid vertices.

Exemplary aspects of the disclosure may include the electronic apparatus 102 that includes circuitry 202. The circuitry 202 may be configured to generate the flat 2D mesh 302A based on an orthographic projection of the initial 3D triangular mesh 114 on an image plane that includes a plurality of square grid vertices. The initial 3D triangular mesh 114 may correspond to a shape-unrefined triangular mesh of an object portion. The circuitry 202 may be further configured to estimate a final grid depth value for each square grid vertex of the plurality of square grid vertices of the flat 2D mesh 302A based on a modified SFS scheme. The modified SFS scheme may correspond to an objective relationship among a reference grid image intensity value, an initial grid depth value, and a grid albedo value for each square grid vertex of the plurality of square grid vertices. The circuitry 202 may be further configured to estimate a final 3D triangular mesh 310A as a shape-refined 3D triangular mesh based on the initial 3D triangular mesh 114 and the estimated final grid depth value for each square grid vertex of the plurality of square grid vertices.

In accordance with an embodiment, the electronic apparatus 102 may further include the scanning device 104 configured to capture a plurality of color images of the object portion and depth information corresponding to the plurality of color images. The circuitry 202 may be further configured to generate the initial 3D triangular mesh 114 that corresponds to the shape-unrefined triangular mesh of the object portion, based on the captured plurality of color images and the corresponding depth information.

In accordance with an embodiment, the circuitry 202 may be further configured to estimate a set of initial depth values for a corresponding set of vertices of a corresponding triangle of the initial 3D triangular mesh 114. The set of initial depth values for the corresponding set of vertices of the corresponding triangle may be estimated, based on a corresponding set of 3D coordinates for the corresponding set of vertices of the corresponding triangle of the initial 3D triangular mesh. The circuitry 202 may be further configured to estimate the initial grid depth value for each square grid vertex of the plurality of square grid vertices based on a barycentric interpolation of the estimated set of initial depth values for the corresponding set of vertices of the corresponding triangle of the initial 3D triangular mesh 114.

The circuitry 202 may be further configured to estimate a set of reference image intensity values for a corresponding set of vertices of a corresponding triangle of the initial 3D triangular mesh 114. The set of reference image intensity values for the corresponding set of vertices of the corresponding triangle may be estimated, based on a projection of the corresponding set of vertices on the color image 110 of the object portion. The circuitry 202 may be further configured to estimate the reference grid image intensity value for each square grid vertex of the plurality of square grid vertices. The reference grid image intensity value for each square grid vertex may be estimated, based on the barycentric interpolation of the estimated set of reference image intensity values for the corresponding set of vertices of the corresponding triangle of the initial 3D triangular mesh 114.

The circuitry 202 may be further configured to estimate a set of albedo values for a corresponding set of vertices of a corresponding triangle of the initial 3D triangular mesh 114, based on a texture map of the object portion. The circuitry 202 may be further configured to estimate the grid albedo value for each square grid vertex of the plurality of square grid vertices. The grid albedo value for each square grid vertex of the plurality of square grid vertices may be estimated, based on a barycentric interpolation of the estimated set of albedo values for the corresponding set of vertices of the corresponding triangle of the initial 3D triangular mesh 114.

In accordance with an embodiment, in the modified SFS scheme, the circuitry 202 may be further configured to estimate a surface normal for each square grid vertex of the plurality of square grid vertices of the flat 2D mesh 302A. The surface normal for each square grid vertex of the plurality of square grid vertices may be estimated based on 2D coordinates for each square grid vertex of the plurality of square grid vertices and the initial grid depth value for each square grid vertex of the plurality of square grid vertices. In the modified SFS scheme, the circuitry 202 may be further configured to estimate the final grid depth value for each square grid vertex of the plurality of square grid vertices of the flat 2D mesh 302A. The final grid depth value for each square grid vertex of the plurality of square grid vertices may be estimated, based on a minimization of the objective relationship for a color difference between an image rendered using a surface normal, an albedo, and a lighting of the object portion and the color image 110 of the object portion.

The circuitry 202 may be further configured to compute, for each triangle of a plurality of triangles of the initial 3D triangular mesh 114, a set of final depth values for a corresponding set of vertices of the corresponding triangle. The set of final depth values for the corresponding set of vertices of the corresponding triangle may be computed, based on the estimated final grid depth value for a corresponding square grid vertex that lies within the corresponding triangle. The circuitry 202 may be further configured to update, for each triangle of the plurality of triangles of the initial 3D triangular mesh 114, a set of initial depth values for the corresponding set of vertices of the corresponding triangle. The set of initial depth values for the corresponding set of vertices of the corresponding triangle may be updated, based on the computed set of final depth values for the corresponding set of vertices of the corresponding triangle.

The circuitry 202 may be further configured to update, for each triangle of the plurality of triangles of the initial 3D triangular mesh 114, the set of initial depth values for the corresponding set of vertices of the corresponding triangle of the initial 3D triangular mesh 114, based on a minimization of an objective function. The objective function may include a relationship between the initial grid depth value and the final grid depth value for a corresponding square grid vertex that lies within the corresponding triangle and a squared difference between final depth values for each vertex and adjacent vertex on the corresponding triangle. The circuitry 202 may be further configured to control a display device to render a 3D model of the object portion based on the estimated final 3D triangular mesh 310A.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic apparatus, comprising:
   circuitry configured to:
   generate a flat two-dimensional (2D) mesh of an object portion based on an orthographic projection of an initial three-dimensional (3D) triangular mesh on an image plane that comprises a plurality of square grid vertices;
   estimate a final grid depth value for each square grid vertex of the plurality of square grid vertices of the flat 2D mesh based on a modified shape from shading (SFS) scheme,
   wherein the modified SFS scheme corresponds to an objective relationship among a reference grid image intensity value, an initial grid depth value, and a grid albedo value for each square grid vertex of the plurality of square grid vertices; and
   estimate a final 3D triangular mesh as a shape-refined 3D triangular mesh based on the initial 3D triangular mesh and the estimated final grid depth value for each square grid vertex of the plurality of square grid vertices.

2. The electronic apparatus according to claim 1, further comprising a scanning device configured to capture a plurality of color images of the object portion and depth information corresponding to the plurality of color images.

3. The electronic apparatus according to claim 2, wherein the circuitry is further configured to generate the initial 3D triangular mesh that corresponds to a shape-unrefined triangular mesh of the object portion, based on the captured plurality of color images and the depth information.

4. The electronic apparatus according to claim 1, wherein the circuitry is further configured to estimate a set of initial depth values for a corresponding set of vertices of a corresponding triangle of the initial 3D triangular mesh, based on a corresponding set of 3D coordinates for the corresponding set of vertices of the corresponding triangle of the initial 3D triangular mesh.

5. The electronic apparatus according to claim 4, wherein the circuitry is further configured to estimate the initial grid depth value for each square grid vertex of the plurality of square grid vertices based on a barycentric interpolation of the estimated set of initial depth values for the corresponding set of vertices of the corresponding triangle of the initial 3D triangular mesh.

6. The electronic apparatus according to claim 1, wherein the circuitry is further configured to estimate a set of reference image intensity values for a corresponding set of vertices of a corresponding triangle of the initial 3D triangular mesh, based on a projection of the corresponding set of vertices on a color image of the object portion.

7. The electronic apparatus according to claim 6, wherein the circuitry is further configured to estimate the reference grid image intensity value for each square grid vertex of the plurality of square grid vertices based on a barycentric interpolation of the estimated set of reference image intensity values for the corresponding set of vertices of the corresponding triangle of the initial 3D triangular mesh.

8. The electronic apparatus according to claim 1, wherein the circuitry is further configured to estimate a set of albedo values for a corresponding set of vertices of a corresponding triangle of the initial 3D triangular mesh, based on a texture map of the object portion.

9. The electronic apparatus according to claim 8, wherein the circuitry is further configured to estimate the grid albedo value for each square grid vertex of the plurality of square grid vertices based on a barycentric interpolation of the estimated set of albedo values for the corresponding set of vertices of the corresponding triangle of the initial 3D triangular mesh.

10. The electronic apparatus according to claim 1, wherein, in the modified SFS scheme, the circuitry is further configured to estimate a surface normal for each square grid vertex of the plurality of square grid vertices of the flat 2D mesh, based on 2D coordinates for each square grid vertex of the plurality of square grid vertices and the initial grid depth value for each square grid vertex of the plurality of square grid vertices.

11. The electronic apparatus according to claim 1, wherein, in the modified SFS scheme, the circuitry is further configured to estimate the final grid depth value for each square grid vertex of the plurality of square grid vertices of the flat 2D mesh, based on a minimization of the objective relationship for a color difference between an image rendered using a surface normal, an albedo, and a lighting on the surface of the object portion and a color image of the object portion.

12. The electronic apparatus according to claim 11, wherein the circuitry is further configured to compute, for each triangle of a plurality of triangles of the initial 3D triangular mesh, a set of final depth values for a corresponding set of vertices of a corresponding triangle of the initial 3D triangular mesh, based on the estimated final grid depth value for a corresponding square grid vertex that lies within the corresponding triangle.

13. The electronic apparatus according to claim 12, wherein the circuitry is further configured to update, for each triangle of the plurality of triangles of the initial 3D triangular mesh, a set of initial depth values for the corresponding set of vertices of the corresponding triangle, based on the computed set of final depth values for the corresponding set of vertices of the corresponding triangle.

14. The electronic apparatus according to claim 12, wherein the circuitry is further configured to update, for each triangle of the plurality of triangles of the initial 3D triangular mesh, a set of initial depth values for the corresponding set of vertices of the corresponding triangle of the initial 3D triangular mesh, based on a minimization of an objective function, and
   wherein the objective function comprises a relationship between the initial grid depth value and the final grid depth value for a corresponding square grid vertex that lies within the corresponding triangle and a squared difference between final depth values for each vertex and adjacent vertex on the corresponding triangle.

15. The electronic apparatus according to claim 1, wherein the circuitry is further configured to control a display device to render a 3D model of the object portion based on the estimated final 3D triangular mesh.

16. The electronic apparatus according to claim 1, wherein the initial 3D triangular mesh corresponds to a shape-unrefined triangular mesh of the object portion.

17. A method, comprising:
   in an electronic apparatus:
   generating a flat two-dimensional (2D) mesh for an object portion based on an orthographic projection of an initial three-dimensional (3D) triangular mesh on an image plane that comprises a plurality of square grid vertices;

estimating a final grid depth value for each square grid vertex of the plurality of square grid vertices of the flat 2D mesh based on a modified shape from shading (SFS) scheme,
    wherein the modified SFS scheme corresponds to an objective relationship among a reference grid image intensity value, an initial grid depth value, and a grid albedo value for each square grid vertex of the plurality of square grid vertices; and
estimating a final 3D triangular mesh as a shape-refined 3D triangular mesh based on the initial 3D triangular mesh and the estimated final grid depth value for each square grid vertex of the plurality of square grid vertices.

18. The method according to claim 17, further comprising estimating a set of initial depth values for a corresponding set of vertices of a corresponding triangle of the initial 3D triangular mesh, based on a corresponding set of 3D coordinates for the corresponding set of vertices of the corresponding triangle of the initial 3D triangular mesh.

19. The method according to claim 18, further comprising estimating the initial grid depth value for each square grid vertex of the plurality of square grid vertices based on a barycentric interpolation of the estimated set of initial depth values for the corresponding set of vertices of the corresponding triangle of the initial 3D triangular mesh.

20. The method according to claim 17, further comprising estimating a set of reference image intensity values for a corresponding set of vertices of a corresponding triangle of the initial 3D triangular mesh, based on a projection of the corresponding set of vertices on a color image of the object portion.

\* \* \* \* \*